(12) United States Patent
Chen et al.

(10) Patent No.: US 11,290,009 B2
(45) Date of Patent: Mar. 29, 2022

(54) HIGH ENERGY EFFICIENCY SWITCHED-CAPACITOR POWER CONVERTER

(71) Applicant: SOUTHEAST UNIVERSITY, Nanjing (CN)

(72) Inventors: Chao Chen, Nanjing (CN); Jun Yang, Nanjing (CN); Xinning Liu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 139 days.

(21) Appl. No.: 16/966,474

(22) PCT Filed: Apr. 30, 2020

(86) PCT No.: PCT/CN2020/087984
§ 371 (c)(1),
(2) Date: Jul. 31, 2020

(87) PCT Pub. No.: WO2020/233383
PCT Pub. Date: Nov. 26, 2020

(65) Prior Publication Data
US 2021/0351693 A1 Nov. 11, 2021

(30) Foreign Application Priority Data
May 17, 2019 (CN) .......................... 201910412554.5

(51) Int. Cl.
*H02M 3/07* (2006.01)
*H02M 1/00* (2006.01)
(52) U.S. Cl.
CPC ........... *H02M 3/07* (2013.01); *H02M 1/0032* (2021.05)

(58) Field of Classification Search
CPC ........ H02M 3/07; H02M 1/0032; H02M 1/08; H02M 3/072
See application file for complete search history.

(56) References Cited

U.S. PATENT DOCUMENTS

| 4,641,130 | A | * | 2/1987 | Mastroianni | .......... H03M 1/403 |
| | | | | | 341/172 |
| 4,831,381 | A | * | 5/1989 | Hester | ................... H03M 1/468 |
| | | | | | 341/172 |

(Continued)

FOREIGN PATENT DOCUMENTS

| CN | 1761136 A | 4/2006 |
| CN | 101286693 A | 10/2008 |

(Continued)

*Primary Examiner* — Kyle J Moody
(74) *Attorney, Agent, or Firm* — Bayramoglu Law Offices LLC

(57) ABSTRACT

A high energy efficiency switched-capacitor power converter includes the transmission gates T1-T7, the capacitors C1-C4, the load capacitor CL, and resistors, PMOS tubes and NMOS tubes. The power converter converts a stable input voltage of 3V into an output voltage of 1V by means of charge transfer. In the state of timing sequence 1, the on-chip capacitor C1, the capacitor C2 and the load capacitor CL are charged in series. In the state of timing sequence 2, the capacitor C1 and the capacitor C2 are connected in parallel to the capacitor CL to supplement the charge loss due to load for the capacitor CL. When the establishment is completed, the voltages across the capacitor C1, the capacitor C2, and the capacitor CL are basically the same. At this time, the voltage drop across the switch tube approximates 0 V during the charge transfer process.

1 Claim, 2 Drawing Sheets

(56) References Cited

U.S. PATENT DOCUMENTS

| | | | | |
|---|---|---|---|---|
| 7,741,981 B1 * | 6/2010 | Wan | ............ | H03M 1/02 341/110 |
| 8,130,133 B2 | 3/2012 | Steensgaard-Madsen | | |

FOREIGN PATENT DOCUMENTS

| CN | 103856044 A | 6/2014 |
|---|---|---|
| CN | 108377090 A | 8/2018 |
| CN | 110149045 A | 8/2019 |

* cited by examiner

HIGH ENERGY EFFICIENCY SWITCHED-CAPACITOR POWER CONVERTER

CROSS REFERENCE TO THE RELATED APPLICATIONS

This application is the national phase entry of International Application No. PCT/CN2020/087984, filed on Apr. 30, 2020, which is based upon and claims priority to Chinese Patent Application No. 201910412554.5, filed on May 17, 2019, the entire contents of which are incorporated herein by reference.

TECHNICAL FIELD

The present invention relates to the field of electronic regulators, and more particularly, to a high energy efficiency switched-capacitor power converter for supplying power to normally open circuits such as a memory, a state machine and a low-frequency oscillator in a sleep state of a system on a chip (SoC).

BACKGROUND

Battery capacity limits the continuous use time of battery-operated devices such as a handheld terminal. In order to extend the charging cycle as much as possible, a power management module in the device maintains the active time of a circuit in down-time mode as much as possible by means of timed wake-up. The above devices are for the most part in a standby or sleep mode within 99% of the time. At the same time, only a low-speed clock circuit and a memory module are maintain in a powered mode, and the operating current also drops to hundreds of anoamperes (nA) or less. As a result, the total standby power consumption becomes the key to restrict the battery life. In this case, a power conversion module must have a higher conversion efficiency to avoid unnecessary energy loss. Traditional linear regulators have a lower conversion efficiency due to a higher voltage difference between the supply voltage and the output voltage. The power consumption of a DC-DC converter itself is difficult to meet the requirements under the low current load condition of the standby mode.

SUMMARY

The objective of the present invention is to overcome the above problem and to provide a high energy efficiency switched-capacitor power converter.

In order to achieve the above objective, the present invention provides a high energy efficiency switched-capacitor power converter, including seven transmission gates composed of the transmission gate T1 to the transmission gate T7, five capacitors composed of the capacitor C1 to the capacitor C4 and a load capacitor CL, resistors, P-type metal-oxide-semiconductor (PMOS) tubes and N-type metal-oxide-semiconductor (NMOS) tubes.

An input terminal of the transmission gate T1 is connected to a voltage input terminal. An output terminal of the transmission gate T1 is connected to an anode of the capacitor C1. A control terminal anode of the transmission gate T1 is connected to a first clock signal anode CK1P and a control terminal cathode of the transmission gate T1 is connected to a first clock signal cathode CK1N.

A cathode of the capacitor C1 is connected to an input terminal of the transmission gate T4. An output terminal of the transmission gate T4 is connected to an anode of the capacitor C2. A control terminal anode of the transmission gate T4 is connected to the first clock signal anode CK1P and a control terminal cathode of the transmission gate T4 is connected to the first clock signal cathode CK1N.

A cathode of the capacitor C2 is connected to an input terminal of the transmission gate T5. An output terminal of the transmission gate T5 is connected to an anode of the load capacitor CL A control terminal anode of the fifth transmission gate T5 is connected to the first clock signal anode CK1P and a control terminal cathode of the transmission gate T5 is connected to the first clock signal cathode CK1N.

The anode of the load capacitor CL is a voltage output terminal of a linear regulator and a cathode of the load capacitor CL is grounded.

An input terminal of the transmission gate T2 is connected to the anode of the capacitor C1. An output terminal of the transmission gate T2 is connected to the voltage output terminal. A control terminal anode of the transmission gate T2 is connected to a second clock signal anode CK2P and a control terminal cathode of the transmission gate T2 is connected to a second clock signal cathode CK2N.

An input terminal of the transmission gate T3 is connected to the anode of the capacitor C2. An output terminal of the transmission gate T3 is connected to the voltage output terminal. A control terminal anode of the transmission gate T3 is connected to the second clock signal anode CK2P and a control terminal cathode of the transmission gate T3 is connected to the second clock signal cathode CK2N.

An input terminal of the transmission gate T6 is connected to the cathode of the capacitor C1. An output terminal of the transmission gate T6 is grounded. A control terminal anode of the transmission gate T6 is connected to the second clock signal anode CK2P and a control terminal cathode of the transmission gate T6 is connected to the second clock signal cathode CK2N.

An input terminal of the transmission gate T7 is connected to the cathode of the capacitor C2. An output terminal of the transmission gate T7 is grounded. A control terminal anode of the transmission gate T7 is connected to the second clock signal anode CK2P and a control terminal cathode of the transmission gate T7 is connected to the second clock signal cathode CK2N.

An anode of the resistor R1 is connected to the voltage input terminal. A cathode of the resistor R1 is connected to a source of a PMOS tube P1. An anode of the capacitor C3 is connected to the voltage input terminal. A cathode of the capacitor C3 is connected to the source of the PMOS tube P1. A gate of the PMOS tube P1 is connected to an output of the inverter I1. A drain of the PMOS tube P1 is connected to a drain of an NMOS tube N1. A source of the NMOS tube N1 is connected to an anode of the resistor R4 and a gate of the NMOS tube N1 is connected to the output of the inverter I1.

An input of the inverter I1 is connected to an input clock. A cathode of the resistor R4 is connected to an anode of the resistor R2 and a cathode of the resistor R2 is grounded. An anode of the capacitor C4 is connected to the anode of the resistor R2 and a cathode of the capacitor C4 is grounded. An anode of the resistor R3 is connected to the source of the PMOS tube P1 and a cathode of the resistor R3 is connected to a source of a PMOS tube P2.

A gate of the PMOS tube P2 is connected to the input clock. A drain of the PMOS tube P2 is connected to a drain of an NMOS tube N2. A gate of the NMOS tube N2 is connected to the input clock and a source of the NMOS tube N2 is connected to the anode of the resistor R2.

An input of the inverter I2 is connected to the drain of the NMOS tube N1 and an output of the inverter I2 is connected to the first clock signal cathode CK1N.

An input of the inverter I3 is connected to the first clock signal cathode CK1N and an output of the inverter I3 is connected to the first clock signal anode CK1P.

An input of the inverter I5 is connected to the drain of the second NMOS tube N2 and an output of the inverter I5 is connected to the second clock signal cathode CK2N.

An input of the inverter I4 is connected to the second clock signal cathode CK2N and an output of the inverter I4 is connected to the second clock signal anode CK2P.

Advantages of the present invention are as follows.

The present invention proposes a high energy efficiency switched-capacitor power converter, which converts a stable input voltage of 3V into an output voltage of 1V by means of charge transfer. The new converter eliminates the static voltage difference of the traditional linear regulator drive tube and can achieve the conversion efficiency not less than eighty percent under a load current of 100 nA.

The charge transfer is achieved by means of the switched-capacitor. Under the action of the clock, the required current is continuously provided to the load. When the output voltage is established and the switch tube is turned on, the voltage difference between two ends is close to 0 V, which substantially reduces the power consumption loss. The power converter of the present invention has features such as a simple structure, a high conversion efficiency, a good process compatibility and a stable output voltage. Furthermore, in applications that require a higher efficiency under a low drive current, the power converter of the present invention has features such as a low bias current, a low temperature coefficient, a wide range of the drive current and a high energy efficiency.

DETAILED DESCRIPTION OF THE EMBODIMENTS

The present invention will be further described in detail below with reference to the drawings and embodiments.

Figure 1:
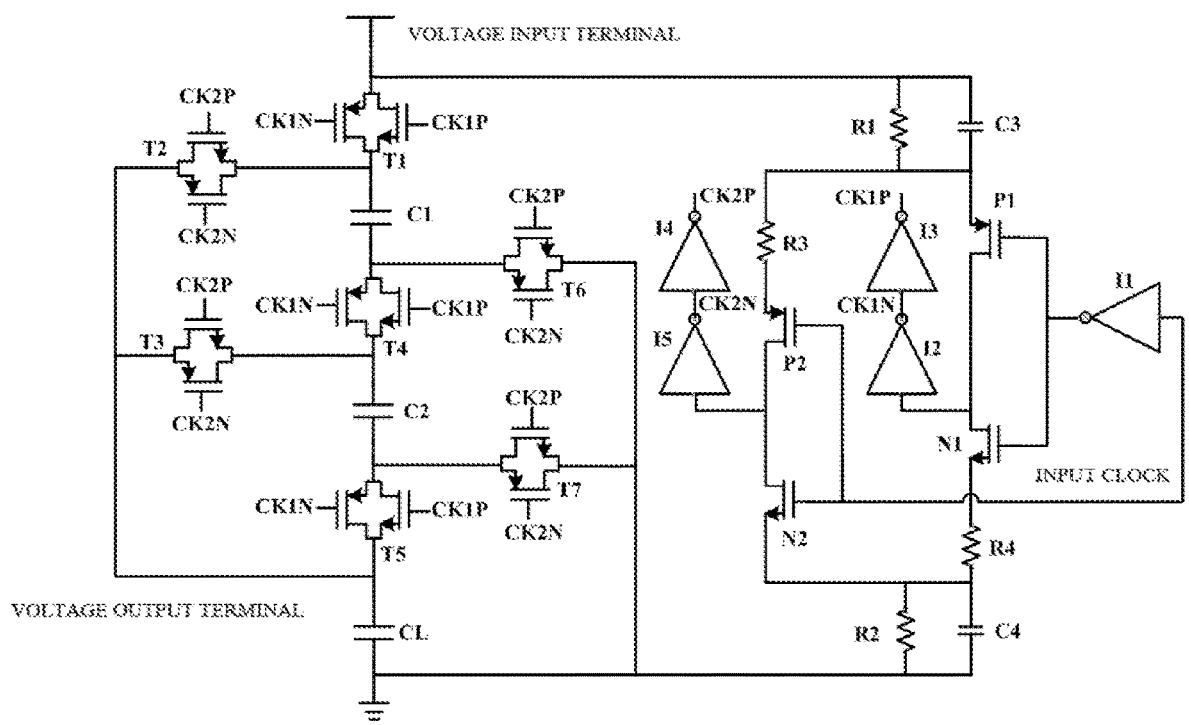
FIG. 1 is a circuit structure diagram of the high energy efficiency switched-capacitor power converter of the present invention.

FIG. 1 is a circuit structure diagram of the high energy efficiency switched-capacitor power converter of the present invention, including seven transmission gates, the transmission gate T1 to the transmission gate T7 respectively; five capacitors, the capacitor C1 to the capacitor C4 and the load capacitor CL, respectively; and resistors, PMOS tubes and NMOS tubes.

An input terminal of the transmission gate T1 is connected to a voltage input terminal. An output terminal of the transmission gate T1 is connected to an anode of the capacitor C1. A control terminal anode of the transmission gate T1 is connected to the first clock signal anode CK1P and a control terminal cathode of the transmission gate T1 is connected to the first clock signal cathode CK1N.

A cathode of the capacitor C1 is connected to an input terminal of the transmission gate T4. An output terminal of the transmission gate T4 is connected to an anode of the capacitor C2. A control terminal anode of the transmission gate T4 is connected to the first clock signal anode CK1P, and a control terminal cathode of the transmission gate T4 is connected to the first clock signal cathode CK1N.

A cathode of the capacitor C2 is connected to an input terminal of the transmission gate T5. An output terminal of the transmission gate T5 is connected to an anode of the load capacitor CL. A control terminal anode of the fifth transmission gate T5 is connected to the first clock signal anode CK1P and a control terminal cathode of the transmission gate T5 is connected to the first clock signal cathode CK1N.

The anode of the load capacitor CL is a voltage output terminal of a linear regulator and a cathode of the load capacitor CL is grounded.

An input terminal of the transmission gate T2 is connected to the anode of the capacitor C1. An output terminal of the transmission gate T2 is connected to the voltage output terminal. A control terminal anode of the transmission gate T2 is connected to the second clock signal anode CK2P and a control terminal cathode of the transmission gate T2 is connected to the second clock signal cathode CK2N.

An input terminal of the transmission gate T3 is connected to the anode of the capacitor C2. An output terminal of the transmission gate T3 is connected to the voltage output terminal. A control terminal anode of the transmission gate T3 is connected to the second clock signal anode CK2P and a control terminal cathode of the transmission gate T3 is connected to the second clock signal cathode CK2N.

An input terminal of the transmission gate T6 is connected to the cathode of the capacitor C1, an output terminal of the transmission gate T6 is grounded. A control terminal anode of the transmission gate T6 is connected to the second clock signal anode CK2P and a control terminal cathode of the transmission gate T6 is connected to the second clock signal cathode CK2N.

An input terminal of the transmission gate T7 is connected to the cathode of the capacitor C2. An output terminal of the transmission gate T7 is grounded. A control terminal anode of the transmission gate T7 is connected to the second clock signal anode CK2P and a control terminal cathode of the transmission gate T7 is connected to the second clock signal cathode CK2N.

An anode of the resistor R1 is connected to the voltage input terminal. A cathode of the resistor R1 is connected to a source of the PMOS tube P1. An anode of the capacitor C3 is connected to the voltage input terminal. A cathode of the capacitor C3 is connected to the source of the PMOS tube P1. A gate of the PMOS tube P1 is connected to an output of the inverter I1. A drain of the PMOS tube P1 is connected to a drain of the NMOS tube N1. A source of the NMOS tube N1 is connected to an anode of the resistor R4 and a gate of the NMOS tube N1 is connected to the output of the inverter I1.

An input of the inverter I1 is connected to an input clock. A cathode of the resistor R4 is connected to an anode of the resistor R2 and a cathode of the resistor R2 is grounded. An anode of the capacitor C4 is connected to the anode of the resistor R2 and a cathode of the capacitor C4 is grounded. An anode of the resistor R3 is connected to the source of the PMOS tube P1 and a cathode of the resistor R3 is connected to a source of the PMOS tube P2.

A gate of the PMOS tube P2 is connected to the input clock. A drain of the PMOS tube P2 is connected to a drain of the NMOS tube N2. A gate of the NMOS tube N2 is connected to the input clock and a source of the NMOS tube N2 is connected to the anode of the resistor R2.

An input of the inverter I2 is connected to the drain of the NMOS tube N1 and an output of the inverter I2 is connected to the first clock signal cathode CK1N.

An input of the inverter I3 is connected to the first clock signal cathode CK1N and an output of the inverter I3 is connected to the first clock signal anode CK1P.

An input of the inverter I5 is connected to the drain of the second NMOS tube N2 and an output of the inverter I5 is connected to the second clock signal cathode CK2N.

An input of the inverter I4 is connected to the second clock signal cathode CK2N and an output of the inverter I4 is connected to the second clock signal anode CK2P.

The operating principle of the above circuit is set out in the paragraph(s) below. In the state of timing sequence 1, the on-chip capacitor C1, the capacitor C2 and the load capacitor CL are charged in series. In the state of timing sequence 2, the capacitor C1 and the capacitor C2 are connected in parallel to the capacitor CL to supplement the charge loss due to load for the capacitor CL. When the establishment is completed, the voltages across the capacitor C1, the capacitor C2, and the capacitor CL are basically the same. At this time, the voltage drop across the switch tube approximates 0 V during the charge transfer process, thus avoiding unnecessary power consumption. The other power consumption of the circuit comes from the clock circuit and the switch control circuit. Since the overlap of the clocks will cause the feedthrough from the power source to the ground, the rising edge and the falling edge of the two-phase clock is configured to separately delay, thereby overcoming the feedthrough.

Figure 2:
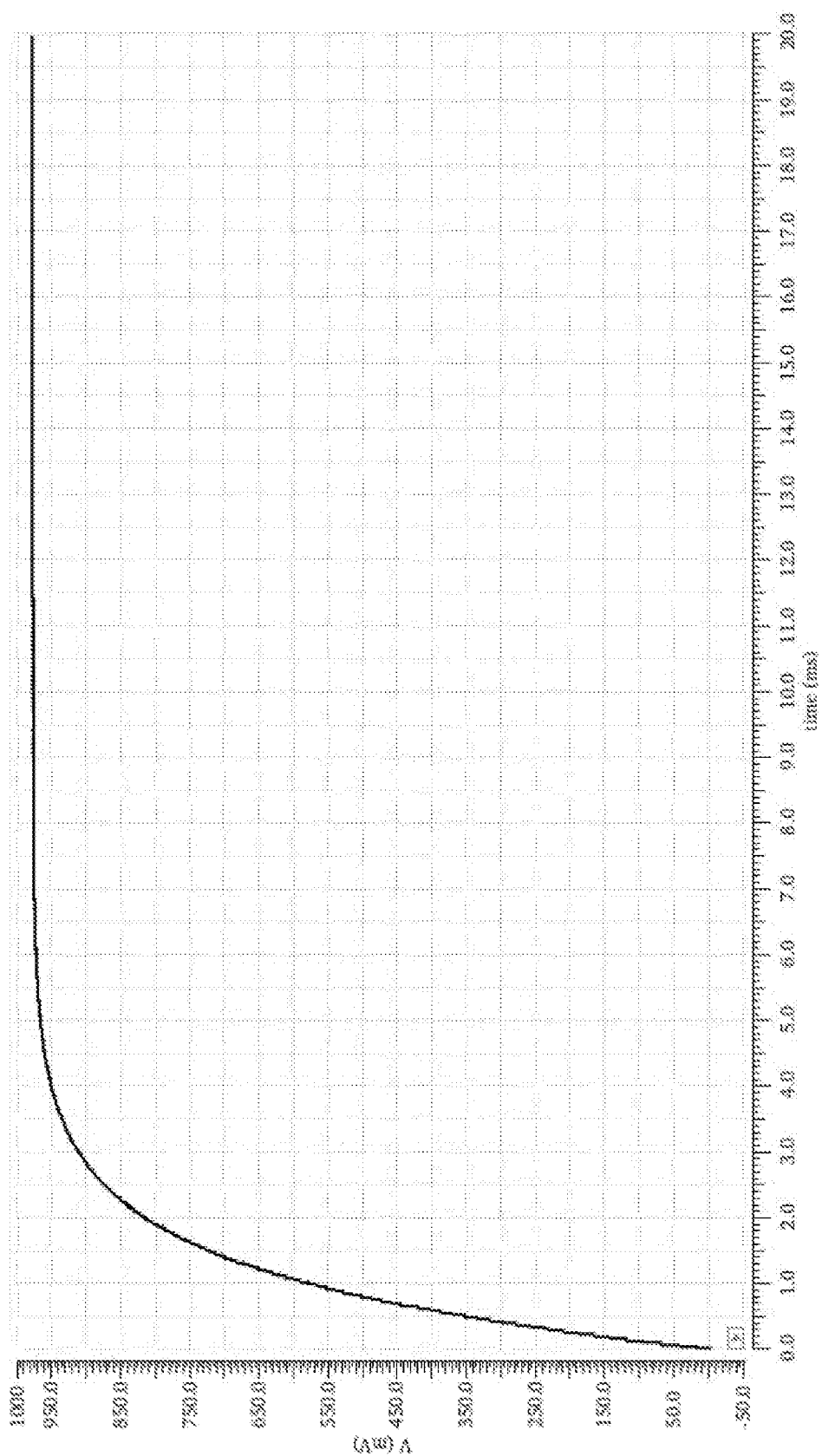
FIG. 2 is an output voltage establishment process of the power converter of the present invention under a drive current of 100 nA.

FIG. 2 is an output voltage establishment process of the power converter of the present invention under a drive current of 100 nA. As shown in the figure, the establishment process of the output voltage has been completed within 6 mS. At this time, the power supply voltage is 3 V. After the establishment is completed, the output voltage is stabilized around 0.985 V. At this time, the output load current is 100 nA, the 3 V power source provides a current of 37 nA and the conversion efficiency at this time is ninety percent (90%).

The technical solutions disclosed in the solutions of the present invention are not limited to the above-mentioned technical solution, but also include technical solutions composed of any combination of the above technical features. The above embodiment is meant to be exemplary. It should be noted that, for those of ordinary skill in the art, without departing from the principles of the present invention, several improvements and modifications can be made. These improvements and modifications are also regarded as the protection scope of the present invention.

What is claimed is:

1. A high energy efficiency switched-capacitor power converter, comprising:
   a first transmission gate, a second transmission gate, a third transmission gate, a fourth transmission gate, a fifth transmission gate, a sixth transmission gate, a seventh transmission gate,
   a first capacitor, a second capacitor, a third capacitor, a fourth capacitor, a load capacitor
   a first resistor, a second resistor, a third resistor, a fourth resistor,
   a first PMOS tube, a second PMOS tube
   a first NMOS tube and a second NMOS tube; wherein
   an input terminal of the first transmission gate is connected to a voltage input terminal, an output terminal of the first transmission gate is connected to an anode of the first capacitor, a control terminal anode of the first transmission gate is connected to a first clock signal anode, and a control terminal cathode of the first transmission gate is connected to a first clock signal cathode;
   a cathode of the first capacitor is connected to an input terminal of the fourth transmission gate, an output terminal of the fourth transmission gate is connected to an anode of the second capacitor, a control terminal anode of the fourth transmission gate is connected to the first clock signal anode, and a control terminal cathode of the fourth transmission gate is connected to the first clock signal cathode;
   a cathode of the second capacitor is connected to an input terminal of the fifth transmission gate T5, an output terminal of the fifth transmission gate T5 is connected to an anode of the load capacitor, a control terminal anode of the fifth transmission gate T5 is connected to the first clock signal anode, and a control terminal cathode of the fifth transmission gate T5 is connected to the first clock signal cathode;
   the anode of the load capacitor is a voltage output terminal of a linear regulator, and a cathode of the load capacitor is grounded;
   an input terminal of the second transmission gate is connected to the anode of the first capacitor, an output terminal of the second transmission gate is connected to the voltage output terminal, a control terminal anode of the second transmission gate is connected to a second clock signal anode, and a control terminal cathode of the second transmission gate is connected to a second clock signal cathode;
   an input terminal of the third transmission gate is connected to the anode of the capacitor, an output terminal of the third transmission gate is connected to the voltage output terminal, a control terminal anode of the third transmission gate is connected to the second clock signal anode, and a control terminal cathode of the third transmission gate is connected to the second clock signal cathode;
   an input terminal of the sixth transmission gate is connected to the cathode of the first capacitor, an output terminal of the sixth transmission gate is grounded, a control terminal anode of the sixth transmission gate is connected to the second clock signal anode, and a control terminal cathode of the sixth transmission gate is connected to the second clock signal cathode;
   an input terminal of the seventh transmission gate is connected to the cathode of the second capacitor, an output terminal of the seventh transmission gate is grounded, a control terminal anode of the seventh transmission gate is connected to the second clock signal anode, and a control terminal cathode of the seventh transmission gate is connected to the second clock signal cathode;
   an anode of the first resistor is connected to the voltage input terminal, a cathode of the first resistor is connected to a source of the first PMOS tube; an anode of the third capacitor is connected to the voltage input terminal, a cathode of the third capacitor is connected to the source of the first PMOS tube; a gate of the first PMOS tube is connected to an output of a first inverter, a drain of the first PMOS tube is connected to a drain of the first NMOS tube; a source of the first NMOS tube is connected to an anode of the fourth resistor, and a gate of the first NMOS tube is connected to the output of the first inverter;

an input of the first inverter is connected to an input clock;
a cathode of the fourth resistor is connected to an anode of the second resistor, and a cathode of the second resistor is grounded; an anode of the fourth capacitor is connected to the anode of the second resistor, and a cathode of the fourth capacitor is grounded; an anode of the third resistor is connected to the source of the first PMOS tube, and a cathode of the third resistor is connected to a source of the second PMOS tube;
a gate of the second PMOS tube is connected to the input clock, a drain of the second PMOS tube is connected to a drain of the second NMOS tube, a gate of the second NMOS tube is connected to the input clock, and a source of the second NMOS tube is connected to the anode of the second resistor;
an input of a second inverter is connected to the drain of the first NMOS tube, and an output of the second inverter is connected to the first clock signal cathode;
an input of a third inverter is connected to the first clock signal cathode, and an output of the third inverter is connected to the first clock signal anode;
an input of a fifth inverter is connected to the drain of the second NMOS tube, and an output of the fifth inverter is connected to the second clock signal cathode; and
an input of a fourth inverter is connected to the second clock signal cathode, and an output of the fourth inverter is connected to the second clock signal anode.

\* \* \* \* \*